United States Patent

[11] 3,615,250

[72] Inventor Richard L. Vernon
 Glendale, Calif.
[21] Appl. No. 810,656
[22] Filed Mar. 26, 1969
[45] Patented Oct. 26, 1971
[73] Assignee Lockheed Aircraft Corporation
 Burbank, Calif.

[54] SUPPLEMENTAL OXYGEN SUPPLY SYSTEM
 8 Claims, 6 Drawing Figs.
[52] U.S. Cl.......................................................... 23/281,
 23/221, 128/142.3, 128/203, 222/3
[51] Int. Cl.......................................................... B01j 7/00
[50] Field of Search............................................ 23/281,
 221; 128/203, 142.3; 222/3

[56] References Cited
 UNITED STATES PATENTS
2,331,944 10/1943 Von Pazsiczky et al. ..... 65/2
2,558,756 7/1951 Jackson et al. ................ 23/281
2,998,018 8/1961 Beck et al. ..................... 222/3 X
3,089,855 5/1963 Bovard ........................... 23/281 X
3,482,568 12/1969 Bovard ........................... 23/281 X Primary Examiner—Joseph Scovronek
Assistant Examiner—Barry S. Richman
Attorneys—George C. Sullivan and Ralph M. Flygare ABSTRACT: An oxygen supply system for aircraft passengers in which a solid oxygen-yielding composition is stored in a hermetically sealed container. An electrical ignition system initiates thermal decomposition of the composition and removes a fusable seal from the container. Oxygen gas is released upon decomposition of the solid composition. A testing circuit is provided to automatically test the operativeness of the ignition system and the fusable container seal. A plurality of containers, linked to a common activating and testing system, provide oxygen for an aircraft passenger compartment.

PATENTED OCT 26 1971
3,615,250
SHEET 1 OF 4
FIG_1
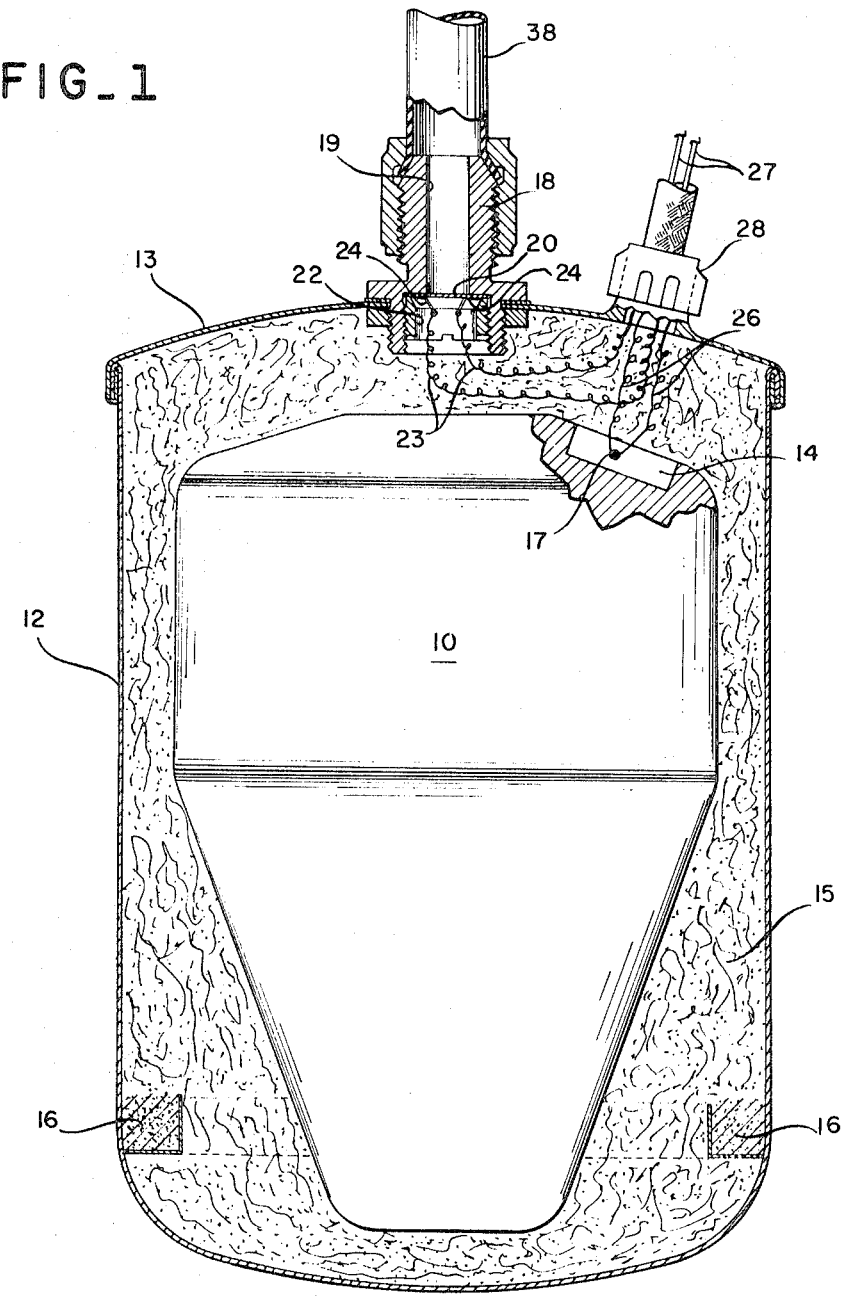
INVENTOR.
RICHARD L. VERNON

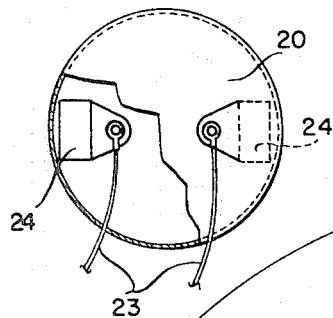
FIG_2
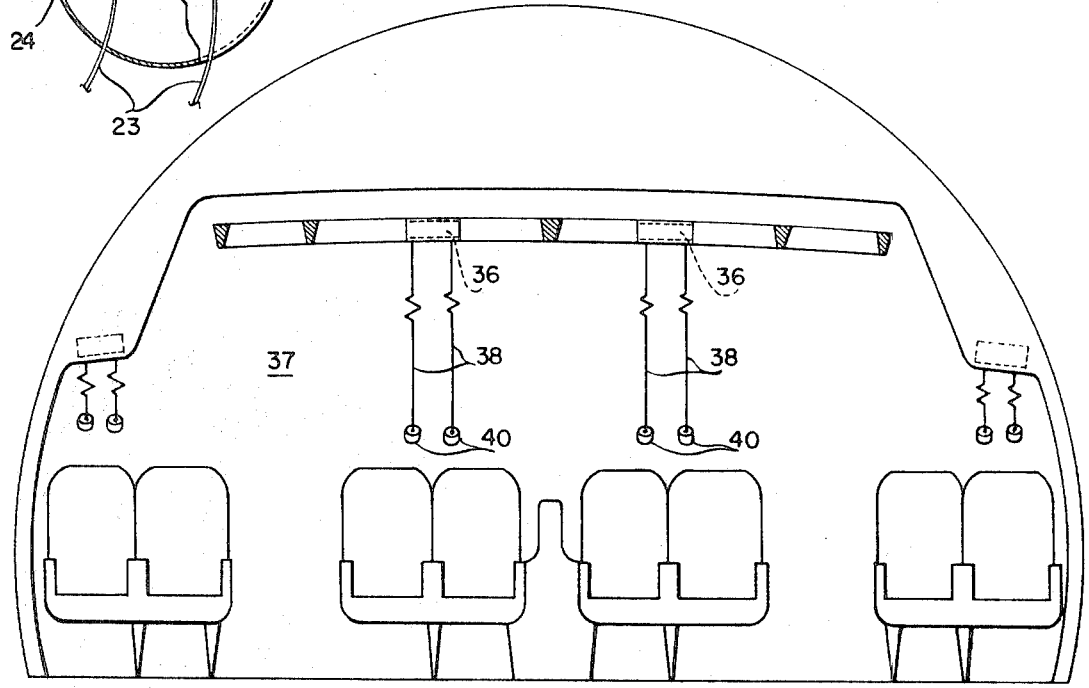
FIG_4
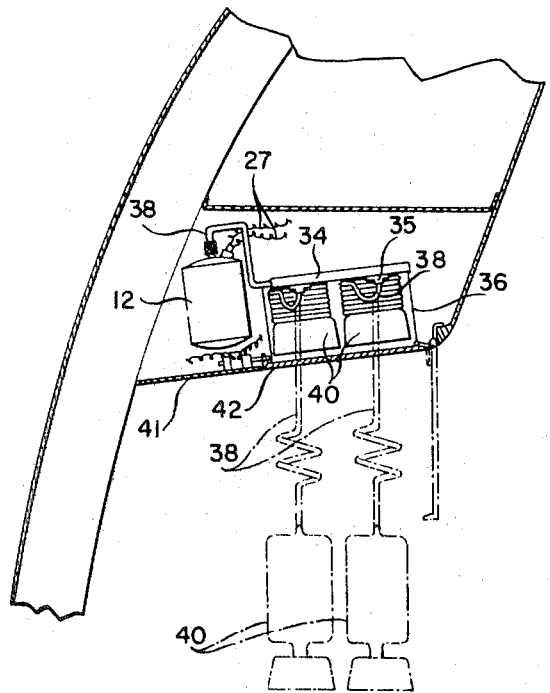
FIG_3

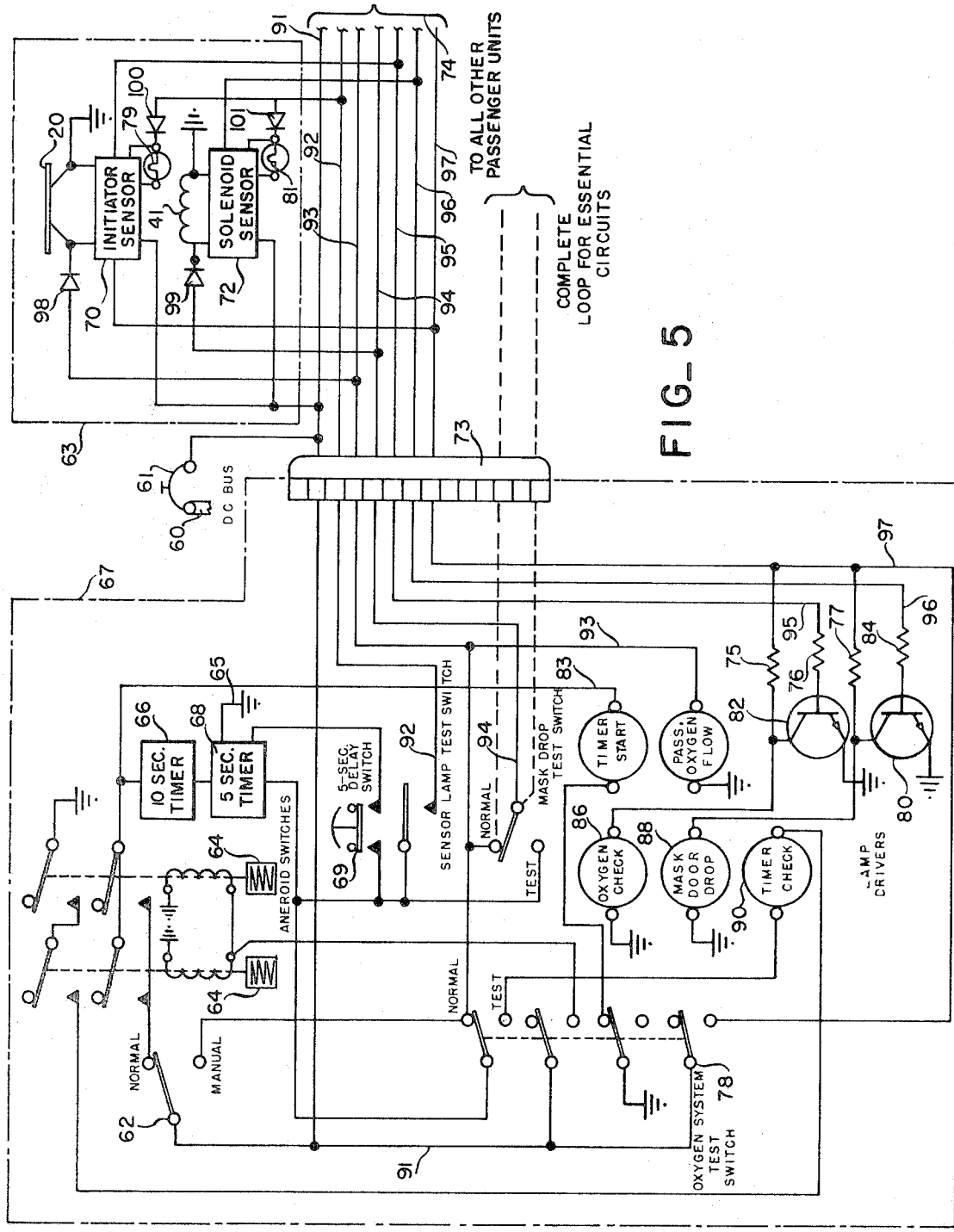
FIG_5
INVENTOR.
RICHARD L. VERNON

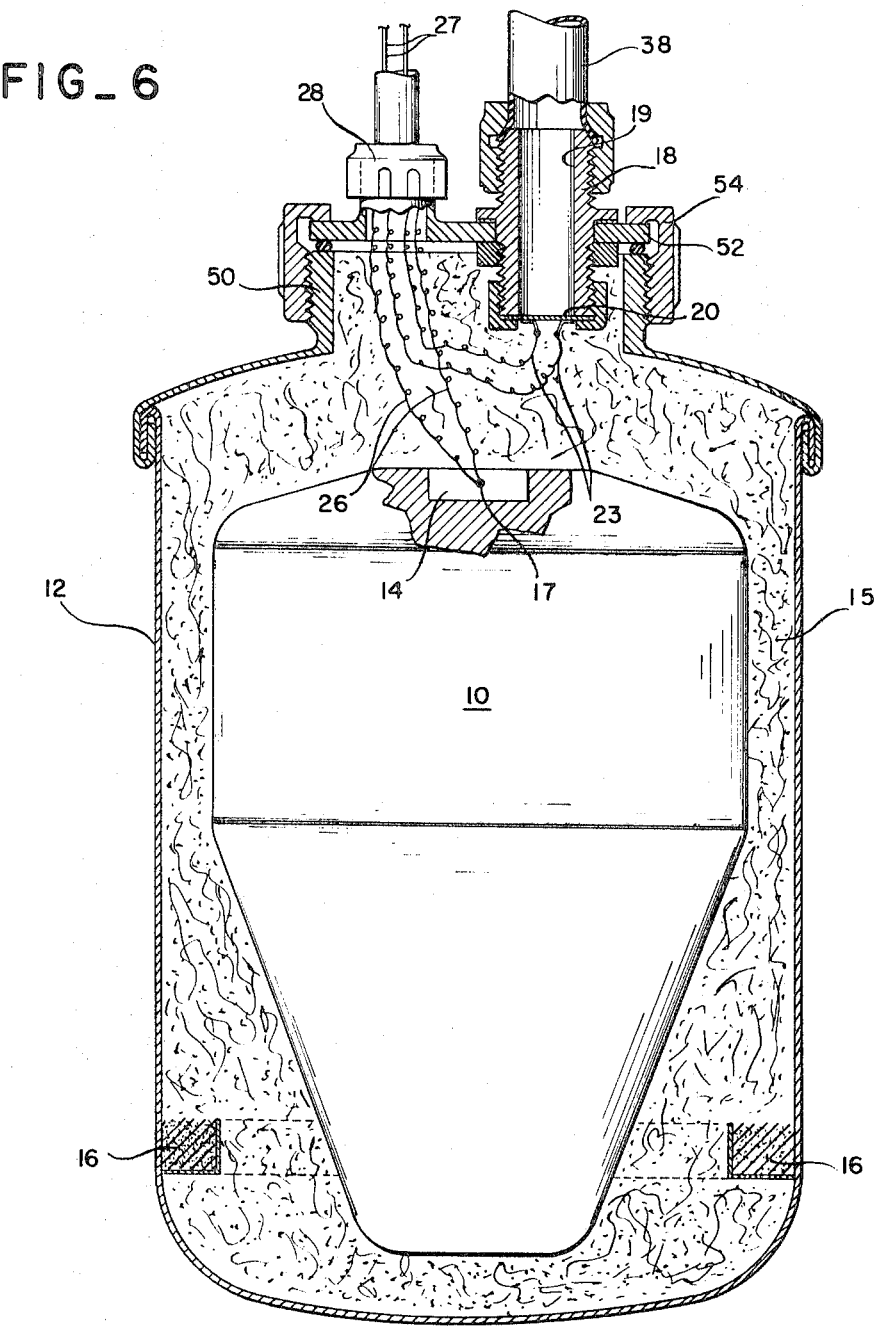

SUPPLEMENTAL OXYGEN SUPPLY SYSTEM

BACKGROUND OF THE INVENTION

1. Field of the Invention

This invention relates to a system of supplying gaseous oxygen from a source of solid-state oxygen to passengers in an aircraft. More particularly, this invention relates to a system for producing gaseous oxygen by thermal decomposition or a type of combustion of a solid oxygen-yielding compound and for automatically providing the oxygen to passengers in an aircraft upon sudden decompression of the passenger compartment.

2. Description of the Prior Art

An emergency supply of oxygen is required for passengers in an aircraft at high altitude in case of an inadvertent cabin pressurization failure. Prior art apparatus and methods for providing oxygen for vehicles other than aircraft include modular sodium chlorate oxygen generators which, upon the combustion of sodium chlorate, yield gaseous oxygen. These prior art generators are not hermetically sealed and are susceptive to an exchange of atmosphere with an aircraft passenger compartment. The gaseous oxygen is piped to an oxygen mask located adjacent a recipient of the oxygen. The application of this use to aircraft passenger compartments involves several problems. One such problem is caused by water vapor in the air which is forced in and out of the sodium chlorate bottles under varying atmospheric pressure conditions. The water vapor chemically affects the compressed sodium chlorate and causes it to become ineffective as a source of oxygen. Prior art solid state oxygen generating systems are also of inherently low reliability in that it is difficult to test the operativeness of all the working parts such as the igniter and most importantly the efficacy of the oxygen-producing chemical. Primarily because of this reliability problem, prior art solid state oxygen producing systems have been mostly confined to underwater uses such as in submarines, where it is possible to store spare generators and wherein weight is not as crucial a factor as it is in an aircraft.

The present emergency oxygen supply system comprises multiple hermetically sealed containers of a combustible solid-state oxygen source which provide oxygen to a plurality of receptacles in the passenger compartment of an aircraft. A remotely controlled circuit is provided to simultaneously remove the container seals and to initiate the combustion process. A test circuit is also provided to test the operativeness of the seal and the ignition circuits.

Accordingly, it is a principal object of the present invention to provide an emergency solid-state oxygen supply for aircraft passengers.

Another object of the present invention is to provide an oxygen supply for aircraft passengers which comprises a system of multiple bottles of an ignitable oxygen-producing chemical, wherein said bottles expel oxygen through a manifold to a passenger compartment.

Yet another object of the present invention is to provide multiple bottles of ignitable sodium chlorate to cabin receptacles in aircraft wherein said bottles are hermetically sealed until ignition of the sodium chlorate.

Still another object of the present invention is to provide an electrical test circuit for bottles of combustible oxygen-producing compound, said bottles remaining sealed until actual use thereof.

SUMMARY OF THE INVENTION

In one of its broadest aspects, the invented latent oxygen supply system comprises a hermetically sealed container having an outlet port; a combustible oxygen-yielding compound located within the container and means for igniting the oxygen-yielding compound and for removing the hermetic seal from the container. Conduit means are connected to the container and conduct oxygen gas to an outlet located adjacent a recipient of the oxygen. Circuit means are provided for automatically testing the operativeness of the ignition means and the hermetic seal of the container.

One of the primary advantages of the described oxygen supply system is its reliability which is assured by a unique electrical testing circuit that tests the operativeness of the seal and of the ignition circuit. Another advantage of the system is that the oxygen-producing apparatus is not centralized thus the hazards of a fire of oxygen gas are minimized. Because multiple oxygen generators are used, no central plumbing system is required thus affording a weight saving over prior art oxygen systems. Still another advantage of this system over prior art systems is that the bottles containing solid-state oxygen are sealed so that moisture-laden air cannot enter; this feature prevents the chemical degradation of the oxygen-producing chemical compound and thus insures reliability.

Yet another advantage of the invented latent oxygen bottle is that atmospheric pressure within the sealed bottle is maintained at approximately 15 pounds per square inch (p.s.i.) thus allowing the ignition system to function at the same pressure as that at which it is tested, this assures uniform ignitions at all altitudes.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example.

BRIEF DESCRIPTION OF THE DRAWINGS

FIG. 1 is an elevation view, partially sectioned, of the latent oxygen supply bottle;

FIG. 2 is a diagrammatic view of the fusable hermetic seal;

FIG. 3 is a diagrammatic view of the oxygen generator and mask in an aircraft fuselage;

FIG. 4 is a diagrammatic view of a system of multiple oxygen masks for supplying passengers;

FIG. 5 is a schematic of the electrical circuit for testing and remotely activating the oxygen supply; and FIG. 6 is an elevation view, partially sectioned, of an alternate embodiment of the oxygen supply container.

DESCRIPTION OF THE PREFERRED EMBODIMENT

Oxygen of sufficient purity for physiological use may be obtained by the thermal decomposition or combustion of chlorates and perchlorates in a suitable apparatus. The self-regulated thermal decomposition of these chlorate "candles" is due to the combustion of finely divided oxidizable material intimately mixed with a chlorate such as sodium chlorate. An inorganic binder is added to the mixture and a peroxide such as barium peroxide is added to inhibit the evolution of chlorine during the combustion process. These constituents are mixed and heated until the chlorate begins to melt; the molten mass is then cast to give candles of the desired size and shape. The above-described chlorate candles are well known in the art as a supply of "solid-state" oxygen and are not claimed a part of the present invention. The significant features of the present invention include a new and improved container for chlorate candles and a remotely activated system of supplying aircraft passengers from a multiplicity of such containers along with a test circuit for testing the efficacy of the oxygen generating apparatus as will be described in detail hereinafter.

With reference to FIG. 1, there is shown a solid state source of physiologically pure oxygen comprising a combustible oxygen producing cast chemical composition 10 within a thin-walled container 12. Typically, chemical composition 10 comprises an oxygen-containing compound such as potassium or sodium chlorate intimately mixed with a powdered oxidizable metal such as iron. Powdered iron is preferably used in the present embodiment. An alkaline oxidizing agent is introduced into the mixture to eliminate the formation of free chlorine; barium peroxide ($BaO_2$) has performed satisfactorily for this function. Powdered fiberglass is then added to the mixture as a binder. These constituents are heated until the chlorate begins to melt, are then cast into a mold of a desired configuration, compressed, and allowed to harden to form a "candle." A typical formulation for such an oxygen producing candle is as follows:

|  | Weight Percent |
| --- | --- |
| $NaClO_3$ | 80 |
| Fe powder (reduced with hydrogen) | 10 |
| $BaO_2$ | 4 |
| Powdered fiberglass (baked at 400° C.) | 6 |

The candles of this composition have a density of about 2.45 grams per mil and will liberate about 34 percent of their weight as gaseous oxygen. It is within the scope of the invention to provide candles having other oxygen-yielding compounds such as other chlorates or perchlorate compound.

One end of the candle 10 contains an ignition area 14. This area comprises the same materials as the rest of the candle but contains a different ratio of components. A typical ignition area mixture contains 60 percent sodium chlorate, 20 percent iron, 10 percent barium oxide and 10 percent fiberglass. When heated locally by an electrical initiator to the reaction point the iron combines with part of the oxygen in the chlorate to form iron oxide. The heat generated by this reaction raises the local temperature of the sodium chlorate and breaks it into oxygen and sodium chloride. The process may be represented by the equation:

$Fe + NaClO_3 \rightarrow FeO + NaCl + O_2$ Upon complete combustion of such a composition, there remains a char containing a ferric oxide, sodium chloride and glass.

With reference again to FIG. 1, a chlorate candle (10) is housed in the container 12. The container 12 is a generally thin-walled cylindrical container of a metal such as stainless steel. The metal of the container should be heat resistant to withstand the combustion temperatures of the chlorate candle. In the presently preferred embodiment of the invention, stainless steel walls of 0.019 inch in thickness are utilized and an insulating material 15 is packed around the chlorate candle within the container 12.

The insulating material 15 prevents a portion of the heat of combustion of the chlorate candle from reaching the container walls and causing them to become excessively hot. The insulating material must also be chemically inert; that is, when material 15 is exposed to high temperatures no noxious fumes must be evolved. One such insulating material that has been successfully used is leached fiberglass chopped into short lengths and packed into the container 12 around the chlorate candle.

Leaching of the fiberglass removes soluble constituents therefrom by percolation, thereby rendering it clean for this purpose.

At various locations within the container and adjacent the container wall, quantities of silica gel 16 or other hygroscopic material are located to absorb water vapor that may leak into the container. The silica gel aids in keeping the chlorate candle free from moisture which would chemically react with the composition of the candle and cause it to flake and to become ineffective as a source of oxygen.

The cylindrical container 12 has a top surface 13 into which is sealably inserted an outlet plug 18 having a conduit 19 which allows oxygen generated within the container to flow out therethrough and into tubing 38. A fusible metallic disc 20 is located within the conduit 19 in such a manner that the conduit is closed off and the container 12 is effectively sealed. The fusible disc 20 is made of a low melting point electrically conductive metal such as an alloy of lead and tin or the like. When a sufficiently high electric current is passed through the disc, its temperature is raised sufficiently to cause it to melt and thus to open the conduit 19. To protect it from the effects of environmental water vapor, a thin polymeric corrosion-resistant coating is applied to all the surfaces of the disc. This coating prevents the formation of discontinuities therein which would prevent the passing of an electric current which could cause the disc not to fuse when the current is applied. The coating also prevents gross corrosion and deterioration of the disc which could cause the seal of the container 12 to be broken. The disc 20 is mounted within the outlet plug 18 upon a cylindrical member 22 which can conveniently be a clamping nut. When mounted upon the member 22, the disc 20 is horizontally disposed across the conduit 19 thereby effectively sealing the conduit. The disc 20 is so constructed that in case ignition of the candle starts before the disc is fused the oxygen pressure from within the container can puncture the disc.

As best seen in FIG. 2, electrical contact is made to the underside of disc 20 by electrical leads 23 which are attached to the disc by stainless steel tabs 24.

An electrical connector 28 is sealably attached to the top 13 of container 12 adjacent the outlet plug 18. Electrical leads 23 and 26 are led into the interior of container 12 through electrical connector 28. As has been previously described, leads 23 provide electrical current to the fusible disc 20 and are attached to the disc by means of stainless steel tabs 24. Disc 20 is fused by passing approximately 0.4 amperes through tabs 24 for 500 milliseconds. This current is lower than that required to initiate the combustion of the candle so that ignition cannot proceed until the disc is fused. Leads 26 provide electrical current to the ignition area 14 of the chlorate candle by means of an embedded electrical element 17. Upon passage of sufficient current, i.e., 0.5 amperes, into the ignition area 14, the enriched composition is heated locally by the igniter element 17 until its ignition temperature is reached and the combustion process commences. Combustion of the chlorate candle then proceeds at a uniform rate with the formation of breathable oxygen gas. The ignition section can be ignited with an electric squib, or an embedded heating wire.

In the alternate embodiment of the invention shown in FIG. 6, the oxygen supply container 12 is provided with a threaded neck portion 50 which is adapted to sealably retain a mounting plate 52. The outlet plug 18 and electrical connector 28 are permanently mounted upon the mounting plate 50 with orifices being provided in the plate for electrical leads 23 and 26 and for conduit 19. A threaded locking nut 54 is threaded onto the threaded neck portion 50 of the container. When the locking nut 54 is connected to the neck portion 50 the mounting plate 52 is sealably retained within the neck portion of the container by the locking nut. Thus, there is provided a quick change assembly for the oxygen supply container. When the chlorate candle (10) is exhausted, locking nut 54 is unthreaded and the mounting plate 52 with the outlet plug 18 and electrical connector mounted thereon is removed from the neck portion 50. A new container can then be provided and the locknut can again be threaded onto its neck portion. Only new electrical leads 23 and 26 are necessary to make the unit operative.

Referring to FIGS. 1, 3, 4 and 6, upon initiation of the combustion process within the oxygen generator, oxygen gas is evolved and expelled from the generator at a pressure of approximately 1 p.s.i. The generator is remotely activated by energizing lead wires 27, which run to the pilot's compartment. The oxygen flows out of the generator container 12 through the conduit 19 of outlet plug 18 and into manifold 34 via interconnecting tubing 38. The rate and volume of oxygen flow can be regulated by properly contouring the chlorate candle. In a typical construction of the invention, the chlorate candle has a cup shape and is 3 inches in diameter and 2.5 inches deep. The oxygen generated by such a candle is expelled from the container at a low constant pressure of approximately 1 p.s.i.

Manifold 34 conducts the oxygen to a location adjacent a mask storage compartment 36 within the passenger compartment 37 of the aircraft. When not in use, the masks 40 are stored within a compartment 36 which is located above the passenger seats. As best seen in FIG. 3, the mask storage compartments are closed by an electrically operated door 42, hereinafter more fully described. The electrical input signal that ignites the chlorate candle composition 10 and fuses the disc 20 also causes the door 42 to open. The mask door 42 is opened by a solenoid 41 which is energized by an electrical circuit in response to the closing of aneroid switches 64, shown in FIG. 5. The door 42 also may be caused to open by means of a manually operated switch 62 in the pilot's compartment.

The opening of door 42 allows the oxygen masks 40 to be lowered from compartment 36 to a position adjacent passenger seats. It is a significant feature of the present invention that immediately upon initiating the oxygen generating process and opening door 42, oxygen is available immediately to passengers at a constant low pressure. The oxygen masks are connected to oxygen manifold 34 by plug-in couplings 35 which incorporate metering orifices that control the even distribution of oxygen flow.

In the presently preferred embodiment of the invention, a plurality of oxygen generators are deployed throughout the passenger compartment of an aircraft. In a typical construction, each oxygen generating bottle (viz, container 12) is approximately 4 ½ inches high and 3.0 inches in diameter and can provide three passengers with oxygen for approximately 15 minutes which is the time taken for an aircraft to descend from 40,000 feet to 10,000 feet in an emergency descent. Thus, the oxygen supply for the passengers is decentralized with every three passengers sharing a single oxygen generator. It is, of course, within the scope of the invention to vary the capacity of the oxygen generators so that more or fewer passengers could use them for a longer or shorter period of time.

With reference to FIG. 5, there is shown the activation circuit for the emergency oxygen electrical system. Power for the emergency oxygen electrical system is derived from a DC standby bus 60, via circuit breaker 61, which is protected from power loss during emergency conditions. A manual bypass switch 62 is located on the flight engineer's control panel 67 and in the "normal" position, power is applied to dual aneroid controlled switches 64. Whenever the cabin pressure falls below a predetermined amount (i.e., pressure corresponding to an altitude of 12,500 feet) aneroid switches 64 will close, thereby activating a timer 66. Two aneroid switches (64) are provided for reliability and they are connected in such a way that either one, or both, may activate the timer 66 when the cabin pressure limit is reached. Timer 66 provides a 10-second delay in activating the system. Timer 66 closes a circuit to ground 65 through normally closed timer switch 68, at the end of the 10-second delay interval. If necessary, an additional 5-second delay can be obtained by manually activating timer 68, to provide 15 seconds total delay for rectifying a temporary condition. The additional 5-second delay is obtained by manually activating timer 68, by means of switch 69, which thereupon changes from its normally closed circuit condition to an open-circuit-to-ground condition for an interval of 5 seconds. If cabin altitude decreases to below 12,500 feet within the 10 (or optionally the 15) second time delay period, the system returns to its normal state without activating the oxygen system or releasing the masks 40. When this corrective action occurs, timers 66 and 68 are automatically reset to their normal state.

The activation circuits form a continuous loop to maintain complete system activation if a single parted wire occurs and are normally grounded to prevent inadvertent operation of the system. These grounds are automatically removed at the completion of the timer delay period. When the circuit is activated, an indicator light goes on on the pilot's control panel 67.

Following a cabin depressurization condition, the complete system can be manually operated by actuating manual switch 62 on the control panel 67.

Upon a cabin depressurization, aneroid switches 64 are closed and power is simultaneously supplied to the oxygen generator initiator circuit and to leads 26, through the fusible disc 20 through leads 22 and to the solenoid-operated latch 50 of the mask compartment.

The DC voltage appearing on bus 60 is supplied both to the passenger unit module 63 and to the control panel 67. The interconnection between the passenger unit module 63 and the control panel 67 is via multiple-contact electrical connector 73. Interconnection to the various remaining passenger unit modules is via cable 74 comprising lines 91–97. Test circuits are completed to the passenger unit module 63 via lines 92, 93, and 94, to diodes 98–101.

The system test circuit utilizes solid-state, microminiature integrated circuit sensors 70 and 72 to check circuit continuity. Each sensor (70–72) has its own indicator light 79 and 81, respectively, which illuminates when continuity is interrupted. These circuits are tested by a wheatstone bridge balancing process. Resistance measured across each of the sensor circuits is balanced with a known resistance 75–77 and 84. If the circuit is impaired, the higher resistance of the faulty circuit will cause the appropriate sensor to signal the lamp driver unit 80, or 82 and cause the OXYGEN CHECK light 86 or MASK DOOR DROP CHECK light 88 on the control panel not to illuminate, indicating a fault has occurred. Each sensor also has its own indicator light 79 and 81, respectively, which illuminates when continuity is interrupted.

When the OXYGEN SYSTEM TEST switch 78 is placed in the test position, the aneroid switches 64 are actuated to the closed position, thus activating the 10-second timer 66. At the same time, power is applied to the individual sensors 70 and 72 which are connected across each generator initiator (20) and mask or latch solenoid 41. The sensor, 70 or 72, puts out a low-magnitude pulse of short duration to prevent system activation. If continuity is complete through all sensor units, the OXYGEN CHECK light 86 and the MASK DOOR CHECK light 88 on the control panel 67 will be illuminated. These check lights are driven via lamp driver transistors 82 and 80, respectively.

Should a fault be detected at any one of the oxygen generators or solenoids (e.g., 20 or 41, etc.), the associated sensor will signal the lamp driver unit 80 or 82 and cause the appropriate check light on the control panel 67 to become illuminated indicating a fault has occurred. This fault can be readily located by means of the individually visible fault indicator lights 79 and 81 at each use point. Actuation of the SENSOR LAMP TEST switch 92 located in the control panel 67 provides a visual illumination check of all indicator lamps in the system. To complete the system test, a TIMER CHECK light 90 is provided on the control panel 67 which will be illuminated 10 seconds after initial activation of the SYSTEM TEST switch 78, indicating proper functioning of the ten second timer 66. Activation of the FIVE-SECOND DELAY switch 69 on the control panel 67 will extinguish the timer check light 90 for a 5-second interval after which this light will again be illuminated to indicate proper functioning of the 5-second timer 68. Illumination of the timer check light 90 also assures circuit continuity through the aneroid switch 64.

A MASK DROP test switch 83 is provided on the control panel 67 which, when activated, opens the oxygen mask doors via solenoid 41, and allows the masks to drop for maintenance purposes, or for demonstrations, without initiating the oxygen generators.

In operation of the emergency oxygen supply system, a cabin depressurization causes aneroid switches 64 to close and after a 10-second delay activates the initiator circuit. Current is supplied simultaneously to fusible disc 20, generator initiator 15 and mask door solenoid 41. The initiator is heated locally until the combustion process is initiated which then proceeds at a uniform rate while liberating oxygen gas. At the same time, the disc 20 is fused thereby opening the conduit 19 and allowing oxygen to flow through a manifold 34 to the oxygen masks 40. The solenoid latch 50 is simultaneously opened allowing the mask compartment door 42 to be opened and the masks 40 to be removed. The oxygen supply continues until the chlorate candle is exhausted.

There is thus provided an oxygen supply system for aircraft passengers which is safe, and reliable. One significant advantage of the present system is that the oxygen generators remain hermetically sealed until used thus preserving the efficacy of the oxygen-producing chlorate candles. Also because of the sealing of the generators, the pressure within them remains constant and they operate at the same pressure at which they are tested; this assures uniform activation of the system at all altitudes. A further advantage of the present system is that the oxygen is supplied at a relatively low pressure, thus in case of a fire there is not "blowtorch" effect as in the case with prior art systems. Another advantage of the invented system is the novel test circuit provided by which the operativeness of the generator initiator, the fusible disc and the mask door solenoid can be tested by resistance-balancing circuits.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. An oxygen supply system comprising:
   an hermetically sealed container having an outlet port;
   a fusible disc sealably located in said outlet port and responsive to the application of an electrical current therethrough to result in the fusing thereof and thereby leave said outlet port substantially unobstructed;
   a combustible oxygen-yielding composition located within said container; and,
   electrical means for sequentially fusing said disc and initiating combustion of said oxygen-yielding composition.

2. The oxygen supply system of claim 1 wherein said combustible oxygen-yielding composition comprises:
   sodium chlorate in the range of 75 to 85 percent by weight;
   powdered iron in the range of 5 to 15 percent by weight;
   powdered glass fibers in the range of 2 to 10 percent by weight; and,
   barium oxide in the range of 2 to 6 percent by weight.

3. The oxygen supply system of claim 1 wherein said electrical means comprises:
   a source of electrical power;
   a resistance heating element embedded in said composition and,
   electrical circuit means interconnecting said power source with said resistance heating element and said sealing member whereby said sealing member will be caused to fuse and unseal said outlet port and thereafter said composition will be heated to its ignition temperature.

4. The oxygen supply system as defined in claim 1 wherein said fusible disc includes:
   a thin, polymeric, corrosion-resistant coating applied to all surfaces thereof.

5. The oxygen supply system as defined in claim 1 wherein said oxygen-yielding composition is formed into a contoured candle, the shape of which results in a substantially constant pressure of gaseous oxygen being generated as combustion proceeds from a given end thereof.

6. An oxygen supply system for an aircraft comprising:
   a hermetically sealed container having an outlet port;
   a disc of electrically conductive low-melting-point metal sealably engaging the outlet port of said container;
   a combustible oxygen-yielding composition located within said container;
   insulating material located within said container and surrounding said combustible oxygen-yielding composition to substantially prevent heat from reaching the container walls;
   remotely controlled means for applying an electrical current to fuse said disc and thereby open said outlet port and thereafter ignite said oxygen-yielding composition; and
   a manifold connected to said outlet port of said container for conducting oxygen gas from said container to an outlet in the passenger compartment of said aircraft.

7. The structure as defined in claim 6 wherein said insulating material comprises chopped fiberglass that has been leached.

8. The structure as defined in claim 6 wherein quantities of a hygroscopic material are situated within said container adjacent the walls thereof.

* * * * *